United States Patent Office 3,595,666
Patented July 27, 1971

3,595,666
PROCESS OF INCREASING FAT-ABSORPTIVITY OF STARCH BY ENZYMATIC HYDROLYSIS
Herbert N. Dunning, Minneapolis, and Eugene H. Borochoff and Howard Olevksy, St. Louis Park, Minn., assignors to General Mills, Inc.
No Drawing. Filed Jan. 5, 1968, Ser. No. 695,831
Int. Cl. A23k 1/00
U.S. Cl. 99—10
2 Claims

ABSTRACT OF THE DISCLOSURE

A process for the improvement in shaping of a fat containing amylaceous food product by extrusion, said product being normally not readily shapeable by extrusion under conditions conventionally employed in the food industry due to the affect of the fat on the food product as a whole; the process comprising the essentially simultaneous contacting of a fat containing amylaceous food product by an alpha-amylase and an amyloglucosidase to partially degrade the starch and the shaping by extrusion of the treated material.

---

The process of our invention is comprised of the conversion of starch in an amylaceous food material containing fat to its various degradation products by the essentially simultaneous contacting of the amylaceous material with an alpha-amylase and amyloglucosidase. This conversion allows the fat containing amylaceous material to be more readily shaped by extrusion in situations where the fat level of the specific material in question is too high to allow for its shaping by conventional extrusion techniques.

The enzymes used in the process of our invention are alpha-amylase and amyloglucosidase. The alpha-amylase randomly attacks the alpha 1-4 bonds in a starch or dextrin molecule resulting in the fragmentation of both linear and branched fragments of starch, i.e. dextrinization. If sufficient time is allotted, under certain conditions, pure alpha-amylase can be made to convert linear glucose chains entirely to a mixture of maltose and dextrose, and branched chains to a mixture of maltose, dextrose, and pannose. (The latter being a trisaccharide containing an alpha 1-6 linkage.) Alpha-amylase is known as a liquifying enzyme because, as commonly used for dextrose conversion, it converts a starch slurry to dextrins thereby thinning it.

The second enzyme used in the process of our invention is an amyloglucosidase. Amyloglucosidase works directly from the nonreducing ends of starch chains, but splits off single glucose units primarily. It acts on alpha 1-4 linkages and alpha 1-6 linkages, the rate of reaction being about 20 times faster on the former than on the latter.

The process of our invention involves the essentially simultaneous contacting of the amylaceous material to be converted. By essentially simultaneous we mean contacting with both enzymes at approximately the same time. We prefer in fact, to contact the amylaceous material with the enzymes simultaneously because this requires only one step.

By fat containing amylaceous material normally difficult to shape by extrusion under conditions conventionally employed in the food industry, we mean a system comprised of an amylaceous material and fat where the fat is present at high levels in relation to the rest of the system so that the material as a whole lacks the cohesiveness necessary for extrusion and shaping on conventionally used food extruders. Different amylaceous systems will, of course, have different fat binding characteristics. In each food system comprised of fat and an amylaceous material, the fat content can be raised to such an extent so as to render the product difficult to shape by extrusion processes conventional to the food industry. The reason for this is that the fat will destroy the cohesiveness required for extrusion of the material. We have found that by utilization of the process of our invention, we are able to more easily shape by extrusion an amylaceous material containing fat which is not normally cohesive enough to be easily extruded and shaped.

There are several factors which affect the shaping by extrusion of a fat containing amylaceous system. Two of the most important factors are the fat absorptiveness of the system and the amount of water in the system. If the particular system involved contains material which is highly fat absorptive and/or adsorptive, relatively high levels of fat may be introduced into the system and the material as a whole will retain its cohesive nature and therefore be capable of being shaped by extrusion. However, there is a point, regardless of the level of fat absorptiveness and/or adsorptiveness of the system, where all of the fat will not be absorbed. The material then lacks cohesiveness and becomes hard to shape and form. Sometimes it is possible to add water to the system to enable the forming and extrusion of the system when fat is present at levels high enough to begin to degrade the cohesiveness of the system as a whole. Water, however, may have undesirable effects on the starch in the material being extruded and the extrudate may be tough and hard to shape and form and may lack desirable eating qualities in other ways.

By the process of our invention we control the cohesiveness system by degrading enzymatically. Factors which affect the cohesiveness of the fat-containing amylaceous system due to the presence of enzymes, are the amount and rate of starch degradation. The most important factors in determining the amount and rate of enzymatic degradation are the concentration of the enzyme, and the temperature-time relationship after the system has been contacted with the enzymes. As is to be expected, in general, the higher the temperature after contacting has taken place, the faster the rate of reaction. This is true up to the point of the thermal inactivation of the enzymes themselves, which is generally between about 80 and 90° C. The time that the enzyme is allowed to work, is, of course, correlated to the holding temperature. For the level of degradation, short times at high temperatures may be designed to be equal to long holding times at comparatively low temperatures. The concentration of enzymes present will also affect the amount and rate of degradation. The higher the concentration the faster the degradation. These factors, i.e. a time-temperature relationship and concentration are all interdependent in effect and are interrelated. Because of the relationship of these factors they all may be manipulated to produce the desired binding qualities.

We are not particularly certain of the compounds that perform the binding operation, their relative amounts, or which among the starch degradation products are the most effective. We assume, however, that the degradation product of amyloglucosidase i.e. dextrose is essential for the enhanced binding properties provided by the teachings of our invention. When alpha-amylase is used only, there is no noticeable improvement in shaping the extrudate as is the case when both enzymes are used.

One of the areas where the process of our invention is used is in the manufacture of cereal based pet foods. A cereal based pet food is defined as one containing a cereal or cereal derived product, added fat and an added proteinaceous material. The proteinaceous material may be either meat or meat by products such as lungs, or vegetable in nature such as soybean meal. These pet foods almost always contain fat for palatability and nutrition and are commonly formed by extrusion. The fat may be added after extrusion or part of the fat may be added prior to extrusion and part afterward. In many grain based pet food formulations it is extremely difficult to add all of the fat to the formulation prior to the extrusion step and retain enough cohesiveness to allow extrusion by extrusion apparatus commonly available to the pet food industry. By the process of our invention we are able to place all of the fat required for palatability and nutrition in the mixture prior to extrusion and still extrude and shape by extrusion apparatus commonly used in the pet food industry.

Another area for the utilization of the process of our invention is the cereal snack industry. Cereal snacks for the purposes of our invention are defined as a food material comprised of a combination of grain or grain derived products, such as flour or starch, and added fat. These products are commonly shaped by extrusion. The fat is often present at levels greater than about 10% and often added by a deep fat frying step. Frying is messy, relatively slow, and requires expensive equipment. By the process of our invention we may mix fat with the grain or grain derived fraction and omit a deep fat frying step to produce snacks which are highly similar to those which have been deep fat fried.

Another advantage of the process of our invention when used in the cereal based snack area is that we can more closely control the texture of the final product. We can, for example, toast the shaped extrudate to produce a highly frangible product or we could use a less harsh heat treatment to produce less crisp snacks or produce fat containing cereal based snacks which are somewhat plastic and chewy in texture.

Another advantage of the process of our invention when applied to the cereal snack industry is, that because of the fat addition prior to extrusion relatively little fat is present on the surface of the snack when compared to deep fat fried snacks and therefore the consumer is left with less of a "greasy" sensation after handling snacks made by the process of our invention.

For any of the applications of the process of our invention the production of some dextrose for use as a sweetener in the final product may be desired. If this is the case extrusion should be done at temperature below the inactivation temperature of the alpha-amylase and the amyloglucosidase and subsequent heat treatments above the inactivation temperature in processing should be performed after the desired level of conversion to dextrose has been achieved. The ratio of conversion and the amount are controlled by the same factors that affect the enzymatic action in shaping by extrusion as mentioned below.

Examples of the process of our invention follow.

EXAMPLE I

The first example of the product of our invention illustrates its use in the production of a typical grain based pet food. The pet food contained the following ingredients (percent rounded off to the nearest .01).

| Ingredient: | Percent by wt. of final product |
|---|---|
| Ground soybean oil meal | 19.73 |
| Wheat flour (70% starch) | 41.28 |
| Bone meal (steamed) | 3.24 |
| Whey | 1.85 |
| Propylene glycol | 3.57 |
| Soybean oil | 1.21 |
| NaCl | .65 |
| Vitamin and mineral mix | .72 |
| Color | .01 |
| Tallow (beef) | 6.36 |
| $H_2O$ | 21.28 |
| Flavor (meat) | .03 |

The procedure for preparing the pet food for extrusion comprises mixing all of the ingredients with the exception of water and then mixing water with the rest of the ingredients. Two lots were prepared in this manner with 1 lot having .008% of alpha-amylase and .008% of amyloglucosidase as measured by weight of the final product. After mixing the samples were held at about 80–85° F. for about 15 minutes.

Each of the samples was placed in a 6 inch diameter water jacketed extruder having two ½ inch by ½ inch orifices. Water was fed into the jacket at temperatures ranging from 150–160° F. during the extrusion. A 2-bladed rotary cutter was used to cut the extrudate into ¾ inch lengths. The extrusion was carried out with the augur feeding mechanism set at 24 r.p.m. and pressure developed was 300 p.s.i.g.

While both samples came through the extruder orifice, the nonenzymatically treated sample was crumbly, lacked cohesiveness and broke apart when handled while the enzymatically treated product had excellent cohesiveness, plasticity and resilience and was handled easily without any evidence of crumbling.

The temperature of extrusion was elevated, and this temperature was maintained after extrusion to promote the conversion to dextrose in the final product because sweetness is desired in certain types of pet food.

EXAMPLE II

This example illustrates the application of our invention to the snack industry. In this example a snack containing fat levels typical of certain snacks, is made without a frying step. Duplicate samples were made by mixing 200 grams of ground puffed rice with 47 grams of coconut oil for 2 minutes. 53 grams of water was added and mixing was continued for 2 minutes. 0.25 gram of alpha-amylase and 0.25 gram of amyloglucosidase was added to the water. The dough was allowed to stand at about 70° F. for 5 minutes and extrusion was attempted. The sample without the enzymes was not satisfactory because it lacked the cohesiveness necessary for forming when pushed through the orifice. the enzymatically treated sample produced an excellent cohesive, plastic, resilient extrudate.

Extrusion was carried out under 250 p.s.i.g. using a fan shaped macaroni die. The sample which has been contacted with the enzymes produced a fan shaped configuration upon cutting.

EXAMPLE III

The enzyme containing extruded product of Example II was dried at 130° F. The resultant product was a tender oil-rich snack containing about 10% moisture and about 18% coconut oil.

A variant within the ambit of our invention is the use of the enzymes to provide a material capable of being shaped by extrusion which is normally incapable of being shaped by extrusion because of lack of cohesiveness for reasons other than the presence of an excess of fat. These and other variables would be obvious to those skilled in the art and are therefore meant to be included within the scope of the teachings herein.

Now, therefore, we claim:

1. A process for preparing a shaped, extruded food product which comprises (1) contacting an amylaceous system containing unabsorbed fat essentially simultaneously with an alpha-amylase and an amyloglucosidase to partially degrade the starch in the system, said amylaceous system containing unabsorbed fat being comprised of an amylaceous material and unabsorbed fat where the unabsorbed fat is present at levels in relation to the rest of the system so that the system as a whole lacks the cohesiveness necessary to be readily shaped by extrusion in the absence of the alpha amylase and amyloglucosidase, and (2) extruding the alpha-amylase and amyloglucosidase treated system to form the shaped, extruded food product.

2. The process of claim 1 wherein the fat containing amylaceous system also contains a proteinaceous material.

(References on following page)

References Cited

UNITED STATES PATENTS

| | | | |
|---|---|---|---|
| 2,784,094 | 3/1957 | Sives | 99—10 |
| 3,139,342 | 6/1964 | Linskey | 99—83 |
| 3,197,338 | 7/1965 | Hurst et al. | 127—40 |
| 3,236,687 | 2/1966 | Smith et al. | 127—38 |
| 3,371,018 | 2/1968 | Ewing et al. | 127—38 |
| 3,420,671 | 1/1969 | Hess et al. | 99—2 |
| 3,329,578 | 7/1967 | Faucett et al. | 195—31 |

OTHER REFERENCES

Kirk-Othmer Encyclopedia of Chemical Technology, 2nd edition, volume 18, p. 682.

NORMAN YUDKOFF, Primary Examiner

C. P. RIBANDO, Assistant Examiner

U.S. Cl. X.R.

99—83, 2; 195—31; 127—38